United States Patent
Kobayashi et al.

(10) Patent No.: US 11,712,683 B2
(45) Date of Patent: Aug. 1, 2023

(54) HEAT SOURCE DEVICE AND METHOD FOR USING SILVER ZEOLITE

(71) Applicant: Rasa Industries, Ltd., Tokyo (JP)

(72) Inventors: Toshiki Kobayashi, Tokyo (JP); Koji Endo, Tokyo (JP)

(73) Assignee: Rasa Industries, Ltd., Tokyo (JP)

( * ) Notice: Subject to any disclaimer, the term of this patent is extended or adjusted under 35 U.S.C. 154(b) by 407 days.

(21) Appl. No.: 16/650,919

(22) PCT Filed: Oct. 5, 2018

(86) PCT No.: PCT/JP2018/037335
§ 371 (c)(1),
(2) Date: Mar. 26, 2020

(87) PCT Pub. No.: WO2019/070049
PCT Pub. Date: Apr. 11, 2019

(65) Prior Publication Data
US 2020/0269223 A1    Aug. 27, 2020

(30) Foreign Application Priority Data
Oct. 5, 2017 (JP) .................. 2017-194877

(51) Int. Cl.
*F23D 14/18* (2006.01)
*B01J 29/24* (2006.01)
(Continued)

(52) U.S. Cl.
CPC .............. *B01J 29/24* (2013.01); *F23C 13/08* (2013.01); *F23D 14/18* (2013.01);
(Continued)

(58) Field of Classification Search
None
See application file for complete search history.

(56) References Cited

U.S. PATENT DOCUMENTS

2004/0131984 A1    7/2004  Satek et al.
2005/0042567 A1    2/2005  Sasaki et al.
(Continued)

FOREIGN PATENT DOCUMENTS

JP    2003211945 A    7/2003
JP    2004101054 A    4/2004
(Continued)

OTHER PUBLICATIONS

Office Action for corresponding Australian Application No. 2018344730 dated Apr. 30, 2021.
(Continued)

*Primary Examiner* — Jason Lau
(74) *Attorney, Agent, or Firm* — Renner, Otto, Boisselle & Sklar, LLP

(57) ABSTRACT

Provided is a new heat source device that utilizes the catalytic reaction heat as a heat source for industries. The heat source device 100 utilizing the catalytic reaction heat of silver zeolite 1 includes an accommodation container 10 for accommodating the silver zeolite 1 while ensuring air permeability, wherein the accommodation container 10 is configured to be ventilated with a mixed gas G containing hydrogen, steam, and air. The mixed gas has a hydrogen concentration of 1 to 20% by volume, a steam concentration of 1 to 95% by volume, an air concentration of 1 to 95% by volume, and a temperature of 100° C. or higher.

10 Claims, 2 Drawing Sheets

(51) Int. Cl.
*F23C 13/08* (2006.01)
*B01J 29/22* (2006.01)
(52) U.S. Cl.
CPC ......... *B01D 2253/108* (2013.01); *B01J 29/22* (2013.01); *F23C 2900/13001* (2013.01); *F23C 2900/9901* (2013.01)

(56) References Cited

U.S. PATENT DOCUMENTS

| | | | |
|---|---|---|---|
| 2014/0105348 A1* | 4/2014 | Lin-Hendel | G21C 9/004 376/282 |
| 2016/0237355 A1* | 8/2016 | Bynum | C01B 3/34 |
| 2018/0029007 A1* | 2/2018 | Kobayashi | B01J 20/3085 |

FOREIGN PATENT DOCUMENTS

| | | |
|---|---|---|
| JP | 200555098 A | 3/2005 |
| WO | 2008045546 A2 | 4/2008 |
| WO | 2016104553 A1 | 6/2016 |
| WO | 2016143764 A1 | 9/2016 |

OTHER PUBLICATIONS

PCT/JP2018/037335; PCT International Search Report and Written Opinion of the International Searching Authority dated Dec. 10, 2018 and its English translation.

\* cited by examiner

○ : OXYGEN
● : ALUMINUM OR SILICON

HEAT SOURCE DEVICE AND METHOD FOR USING SILVER ZEOLITE

The present application is a U.S. National Stage Application based on and claiming benefit of and priority under 35 U.S.C. § 371 to International Application No. PCT/JP2018/037335, filed 5 Oct. 2018, which in turn claims benefit of and priority to Japanese Application No. 2017-194877, filed 5 Oct. 2017, the entirety of each of which is hereby incorporated herein by reference.

TECHNICAL FIELD

The present invention relates to a heat source device utilizing the catalytic reaction heat of silver zeolite and a method for using silver zeolite.

BACKGROUND ART

Conventionally, combustion heat sources, such as gas burners and petroleum burners, have been widely used as heat sources for various devices. However, nowadays there is a tendency that a heat source is required to be designed in consideration of more safety and environment. A catalytic reaction heater that utilizes the catalytic reaction heat as disclosed in, for example, Patent Document 1, does not cause any concern about accidental fire or the like because it is not accompanied by the generation of flame and thus can become a heat source with higher safety than the combustion heat source.

CITATION LIST

Patent Literature

Patent Document 1: Japanese Unexamined Patent Application Publication No. 2005-55098

SUMMARY OF INVENTION

Technical Problem

However, in the catalytic reaction heater, typified by that described in Patent Document 1, a catalyst with a sufficient activity needs to be selected in order to generate an adequate amount of heat. Further, the catalyst also needs to have some degree of durability in order to serve as a practical heat source. However, it is not said that the catalysts heretofore known have enough activity and durability to withstand industrial use.

With the above problems in mind, the present invention has been made. It is an object of the present invention to provide a new heat source device that utilizes the catalytic reaction heat as a heat source for industries. Further, it is an object of the present invention to provide a new method for using silver zeolite as a catalyst.

Solution to Problem

To achieve the above object, a heat source device according to the present invention is characterized that it utilizes a catalytic reaction heat of silver zeolite, including an accommodation container for accommodating the silver zeolite while ensuring air permeability, wherein the accommodation container is configured to be ventilated with a mixed gas containing hydrogen, steam, and air.

In the heat source device having this feature, by ventilating the accommodation container with the mixed gas containing hydrogen, steam, and air, the hydrogen is adsorbed into the silver zeolite, and concurrently the adsorbed hydrogen reacts with oxygen in the air through the silver zeolite, thereby generating a large amount of catalytic reaction heat during this time. Since the catalytic reaction between the hydrogen and the oxygen in the air through the silver zeolite proceeds in the presence of steam, no hydrogen explosion occurs even when the catalytic reaction heat is continuously generated to cause the high-temperature situation, which can ensure the high level of safety. Therefore, the catalytic reaction heat can be utilized as a heat source.

In the heat source device of the present invention, the mixed gas preferably has a hydrogen concentration of 1 to 20% by volume, a steam concentration of 1 to 95% by volume, an air concentration of 1 to 95% by volume, and a temperature of 100° C. or higher.

In the heat source device having this feature, since the composition and temperature of the mixed gas with which the accommodation container is ventilated are set within appropriate ranges, the catalytic reaction between the hydrogen and the oxygen in the air through the silver zeolite continuously proceeds efficiently while maintaining the high level of safety, thus enabling the catalytic reaction heat to be suitably utilized as the heat source.

In the heat source device of the present invention, a temperature of the silver zeolite accommodated in the accommodation container preferably becomes 400° C. or higher after one minute has elapsed from the ventilation of the accommodation container with the mixed gas.

In the heat source device having this feature, when the accommodation container is ventilated with the mixed gas, the silver zeolite sufficiently generates heat for a short period of time, thus enabling the catalytic reaction heat of silver zeolite to be suitably utilized as the heat source.

In the heat source device of the present invention, the silver zeolite is preferably at least one selected from the group consisting of zeolite AgX in which at least a part of ion exchange sites included in zeolite X is substituted with silver, zeolite AgA in which at least a part of ion exchange sites included in zeolite A is substituted with silver, zeolite AgY in which at least a part of ion exchange sites included in zeolite Y is substituted with silver, zeolite AgL in which at least a part of ion exchange sites included in zeolite L is substituted with silver, and zeolite Ag mordenite in which at least a part of ion exchange sites included in zeolite mordenite is substituted with silver.

In the heat source device having this feature, at least one selected from the group consisting of the zeolite AgX, the zeolite AgA, the zeolite AgY, the zeolite AgL, and the zeolite Ag mordenite is adopted as the silver zeolite. In this case, the catalytic reaction between the hydrogen and the oxygen in the air through the silver zeolite continuously proceeds efficiently while maintaining the high level of safety, thus enabling the catalytic reaction heat to be suitably utilized as the heat source.

In the heat source device of the present invention, the silver zeolite is preferably at least one selected from the group consisting of zeolite AgMX in which at least a part of ion exchange sites included in zeolite X is substituted with silver and a metal other than silver, zeolite AgMA in which at least a part of ion exchange sites included in zeolite A is substituted with silver and a metal other than silver, zeolite AgMY in which at least a part of ion exchange sites included in zeolite Y is substituted with silver and a metal other than silver, zeolite AgML in which at least a part of ion exchange sites included in zeolite L is substituted with silver and a metal other than silver, and zeolite AgM mordenite in which at least a part of ion exchange sites included in zeolite mordenite is substituted with silver and a metal other than silver.

In the heat source device having this feature, at least one selected from the group consisting of the zeolite AgMX, the zeolite AgMA, the zeolite AgMY, the zeolite AgML, and the zeolite AgM mordenite is adopted as the silver zeolite. Also in this case, the catalytic reaction between the hydrogen and the oxygen in the air through the silver zeolite continuously proceeds efficiently while maintaining the high level of safety, thus enabling the catalytic reaction heat to be suitably utilized as the heat source.

In the heat source device of the present invention, the metal other than silver is preferably at least one metal selected from the group consisting of lead, nickel, and copper.

In the heat source device having this feature, since the appropriate metal other than silver is also adopted in the zeolite AgMX, the zeolite AgMA, the zeolite AgMY, the zeolite AgML, and the zeolite AgM mordenite, the catalytic reaction between the hydrogen and the oxygen in the air through the silver zeolite continuously proceeds efficiently while maintaining the high level of safety, thus enabling the catalytic reaction heat to be suitably utilized as the heat source.

In the heat source device of the present invention, the accommodation container is preferably configured as a metal cylindrical member that includes a metal ventilation structure having a mesh on a downstream side in a ventilation direction, the mesh having a mesh size finer than a particle diameter of the silver zeolite.

In the heat source device having this feature, by configuring the accommodation container as the metal cylindrical member with the metal ventilation structure on the downstream side in the ventilation direction such that the mesh has the mesh size finer than the particle diameter of the silver zeolite, the catalytic reaction between the hydrogen and the oxygen in the air through the silver zeolite can more efficiently proceed within the accommodation container without any leakage of the silver zeolite from the accommodation container. This enables the catalytic reaction heat to be suitably used as the heat source.

In the heat source device of the present invention, the cylindrical member preferably has a double pipe structure including an inner pipe and an outer pipe.

In the heat source device having this feature, by forming the cylindrical member such that it has the double pipe structure including the inner pipe and the outer pipe, the heat medium is allowed to flow through an annular space formed between the inner pipe and the outer pipe, thereby improving the thermal efficiency and also making the usability of the heat source device better.

In the heat source device of the present invention, a separation distance between the inner pipe and the outer pipe is preferably set in accordance with the particle diameter of the silver zeolite.

In the heat source device having this feature, by setting the separation distance between the inner pipe and the outer pipe in accordance with the particle diameter of the silver zeolite, the catalytic reaction heat generated at the surface of the silver zeolite is transferred from the inner pipe to the outer pipe with less loss. In addition, the flow resistance of the heat medium is prevented from becoming excessive even when the heat medium flows through the annular space between the inner pipe and the outer pipe. As a result, this can achieve the heat source device that makes the most of the properties of silver zeolite as the heat source.

To achieve the above object, a method for using silver zeolite according to the present invention is characterized in that a catalytic reaction heat generated by ventilating silver zeolite with a mixed gas containing hydrogen, steam, and air is utilized as a heat source.

In the method for using silver zeolite having this feature, by ventilating the silver zeolite with the mixed gas containing hydrogen, steam, and air, the hydrogen is adsorbed into the silver zeolite, and concurrently the adsorbed hydrogen reacts with oxygen in the air through the silver zeolite, thereby generating a large amount of catalytic reaction heat during this time. Since the catalytic reaction between the hydrogen and the oxygen in the air through the silver zeolite proceeds in the presence of steam, no hydrogen explosion occurs even when the catalytic reaction heat is continuously generated to cause the high-temperature situation, which can ensure the high level of safety. Therefore, the catalytic reaction heat can be utilized as a heat source.

In the method for using silver zeolite of the present invention, the mixed gas preferably has a hydrogen concentration of 1 to 20% by volume, a steam concentration of 1 to 95% by volume, an air concentration of 1 to 95% by volume, and a temperature of 100° C. or higher.

In the method for using silver zeolite having this feature, since the composition and temperature of the mixed gas with which the silver zeolite is ventilated are set within appropriate ranges, the catalytic reaction between the hydrogen and the oxygen in the air through the silver zeolite continuously proceeds efficiently while maintaining the high level of safety. This enables the catalytic reaction heat to be utilized as the heat source.

In the method for using silver zeolite of the present invention, the silver zeolite is preferably ventilated with the mixed gas such that a temperature of the silver zeolite becomes 400° C. or higher after one minute has elapsed from the ventilation of the silver zeolite with the mixed gas.

In the method for using silver zeolite having this feature, the silver zeolite sufficiently generates heat for a short period of time through the ventilation with the mixed gas, thus enabling the catalytic reaction heat to be suitably utilized as the heat source.

In the method for using silver zeolite of the present invention, the silver zeolite is preferably at least one selected from the group consisting of zeolite AgX in which at least a part of ion exchange sites included in zeolite X is substituted with silver, zeolite AgA in which at least a part of ion exchange sites included in zeolite A is substituted with silver, zeolite AgY in which at least a part of ion exchange sites included in zeolite Y is substituted with silver, zeolite AgL in which at least a part of ion exchange sites included in zeolite L is substituted with silver, and zeolite Ag mordenite in which at least a part of ion exchange sites included in zeolite mordenite is substituted with silver.

In the method for using silver zeolite having this feature, at least one selected from the group consisting of the zeolite AgX, the zeolite AgA, the zeolite AgY, the zeolite AgL, and the zeolite Ag mordenite is adopted as the silver zeolite. In this case, the catalytic reaction between the hydrogen and the oxygen in the air through the silver zeolite continuously proceeds efficiently while maintaining the high level of safety, thus enabling the catalytic reaction heat to be suitably utilized as the heat source.

In the method for using silver zeolite of the present invention, the silver zeolite is preferably at least one selected from the group consisting of zeolite AgMX in which at least a part of ion exchange sites included in zeolite X is substituted with silver and a metal other than silver, zeolite AgMA in which at least a part of ion exchange sites included in zeolite A is substituted with silver and a metal other than silver, zeolite AgMY in which at least a part of ion exchange sites included in zeolite Y is substituted with silver and a metal other than silver, zeolite AgML in which at least a part of ion exchange sites included in zeolite L is substituted with silver and a metal other than silver, and zeolite AgM mordenite in which at least a part of ion exchange sites included in zeolite mordenite is substituted with silver and a metal other than silver.

In the method for using silver zeolite having this feature, at least one selected from the group consisting of the zeolite AgMX, the zeolite AgMA, the zeolite AgMY, the zeolite AgML, and the zeolite AgM mordenite is adopted as the silver zeolite. Also in this case, the catalytic reaction between the hydrogen and the oxygen in the air through the silver zeolite continuously proceeds efficiently while maintaining the high level of safety, thus enabling the catalytic reaction heat to be suitably utilized as the heat source.

In the method for using silver zeolite of the present invention, the metal other than silver is preferably at least one metal selected from the group consisting of lead, nickel, and copper.

In the method for using silver zeolite having this feature, since an appropriate metal is adopted as the metal other than silver in the zeolite AgMX, the zeolite AgMA, the zeolite AgMY, the zeolite AgML, and the zeolite AgM mordenite, the catalytic reaction between the hydrogen and the oxygen in the air through the silver zeolite continuously proceeds efficiently while maintaining the high level of safety. This enables the catalytic reaction heat to be suitably utilized as the heat source.

DESCRIPTION OF EMBODIMENTS

Hereinafter, embodiments according to the present invention will be described. Note that the present invention is not intended to be limited to the configurations described in the embodiments and drawings below.

First, the circumstances leading to the technique related to the present invention will be described. The present inventors have found out that zeolite X with at least a part of Na sites substituted with Ag (zeolite AgX), which is one kind of silver zeolite, has a high iodine adsorption capability, filed a patent application regarding a radioactive iodine adsorbent for preparation of severe accidents in nuclear reactors, and acquired the patent right (Japanese Patent Publication No. 5504368) on Mar. 20, 2014. According to the specification of the above-mentioned patent, it is clear that the zeolite AgX has not only the radioactive-iodine adsorption capability, but also an excellent hydrogen adsorption capability.

The present inventors have further investigated the above-mentioned zeolite AgX and newly found out that when hydrogen is adsorbed into the zeolite AgX, if the zeolite AgX is ventilated with a mixed gas containing hydrogen with steam and air added thereto, the zeolite AgX exhibits a more favorable hydrogen adsorption capability, and the catalytic reaction (consumption of hydrogen) proceeds safely without occurrence of hydrogen explosion even in a high temperature situation because the mixed gas contains steam. This further makes it possible to effectively take out the generated catalytic reaction heat. In the present invention, the heat generated when a catalytic reaction between hydrogen and air (oxygen) using silver zeolite, including zeolite AgX, in the presence of steam can be utilized as a heat source for various industries.

Figure 1:
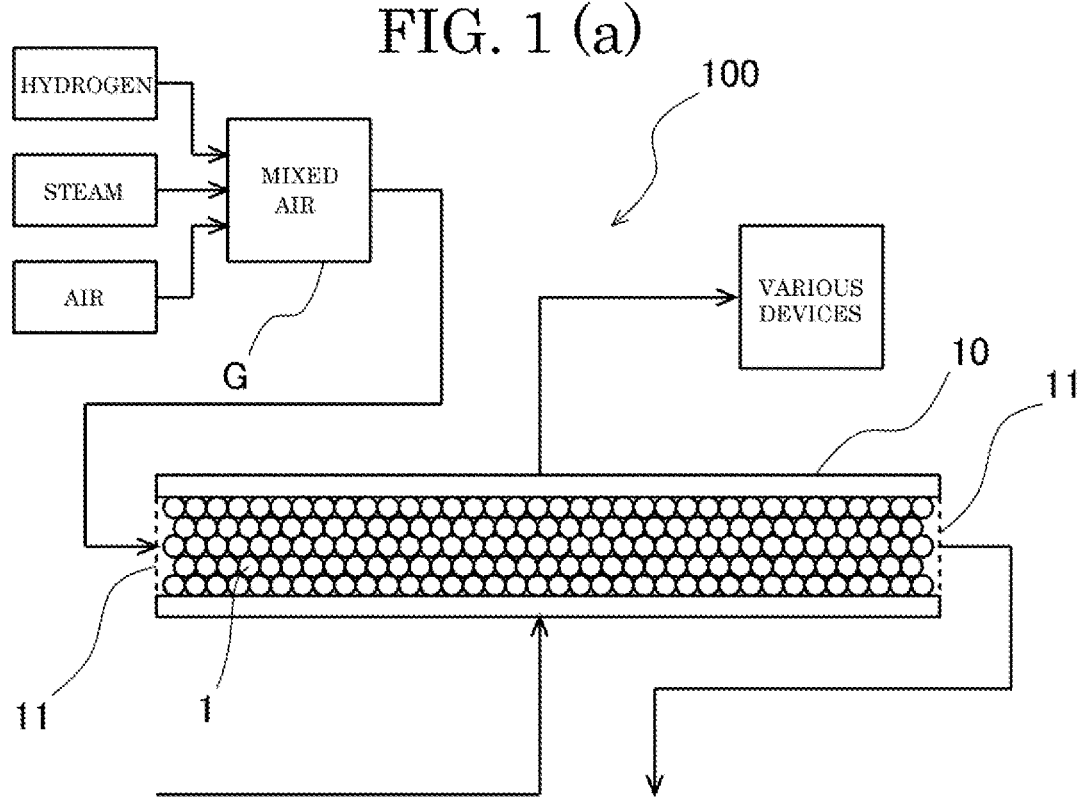
FIG. 1 is a schematic configuration diagram of a heat source device of the present invention.
Figure 1:
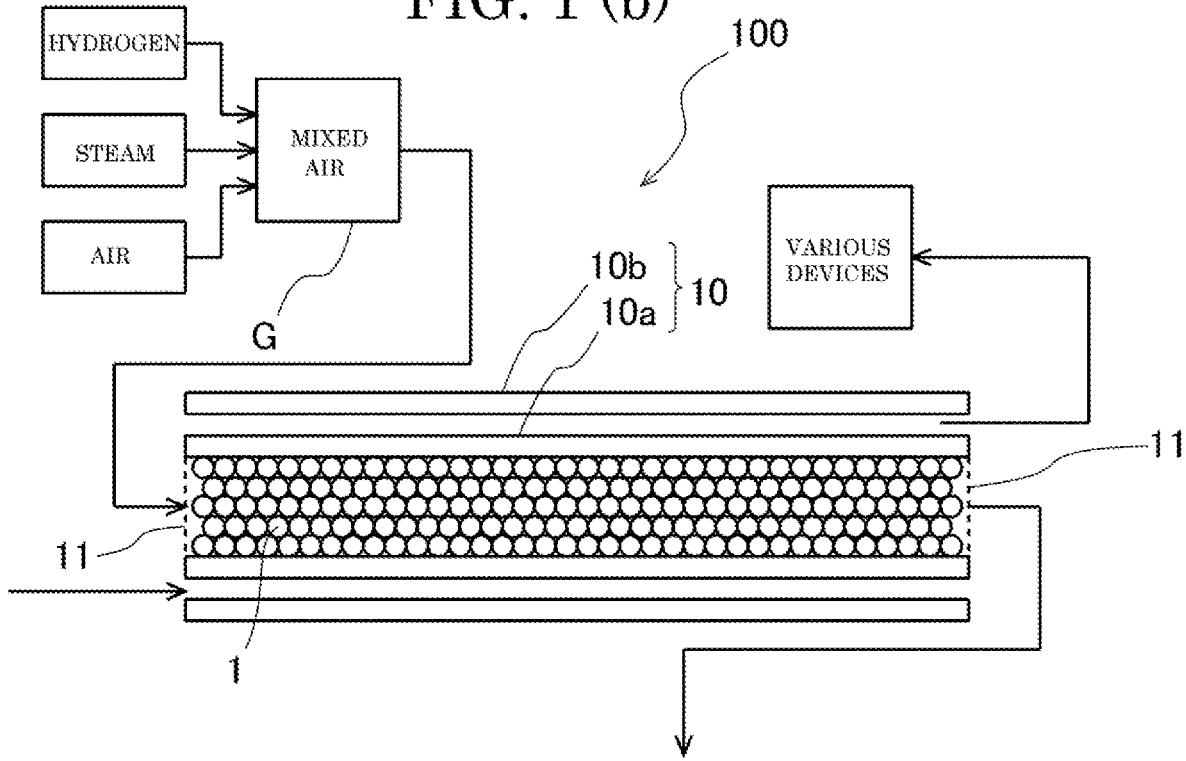

FIG. 1 is a schematic configuration diagram of a heat source device 100 of the present invention. FIG. 1(a) shows the heat source device 100 according to a first embodiment, and FIG. 1(b) shows a heat source device 100 according to a second embodiment. As a main configuration common to the respective embodiments, the heat source device 100 includes an accommodation container 10 that accommodates silver zeolite 1.

The silver zeolite 1 includes any of various types of zeolites as a basic skeleton, at least a part of ion exchange sites of the basic skeleton being substituted with silver. Examples of such a silver zeolite 1 include zeolite AgX in which at least a part of ion exchange sites included in zeolite X is substituted with silver, zeolite AgA in which at least a part of ion exchange sites included in zeolite A is substituted with silver, zeolite AgY in which at least a part of ion exchange sites included in zeolite Y is substituted with silver, zeolite AgL in which at least a part of ion exchange sites included in zeolite L is substituted with silver, and zeolite Ag mordenite in which at least a part of ion exchange sites included in zeolite mordenite is substituted with silver.

Other examples of the silver zeolite 1 include zeolite AgMX in which at least a part of ion exchange sites included in zeolite X is substituted with silver and a metal other than silver, zeolite AgMA in which at least a part of ion exchange sites included in zeolite A is substituted with silver and a metal other than silver, zeolite AgMY in which at least a part of ion exchange sites included in zeolite Y is substituted with silver and a metal other than silver, zeolite AgML in which at least a part of ion exchange sites included in zeolite L is substituted with silver and a metal other than silver, and zeolite AgM mordenite in which at least a part of ion exchange sites included in zeolite mordenite is substituted with silver and a metal other than silver. In this case, examples of the metal other than silver include lead, nickel, copper, and the like.

In the present invention, particularly, the zeolite AgX that has a high hydrogen molecule adsorption capability is suitably used.

Figure 2:
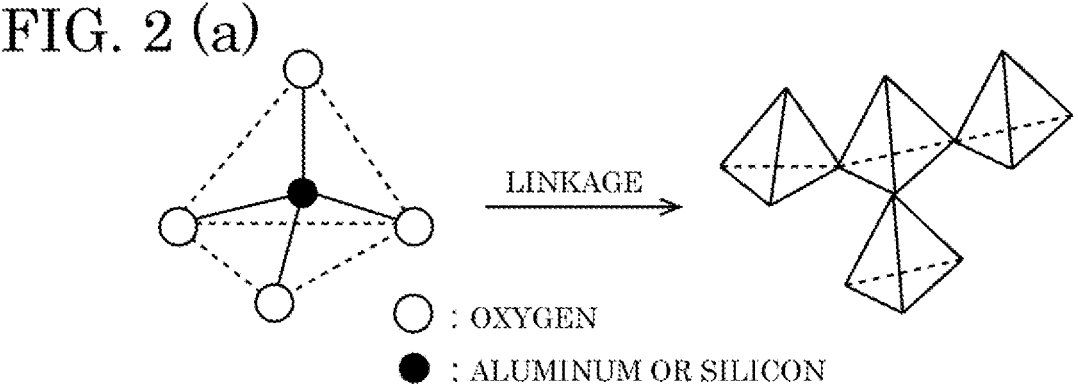
FIG. 2 is an explanatory diagram regarding zeolite AgX.
Figure 2:
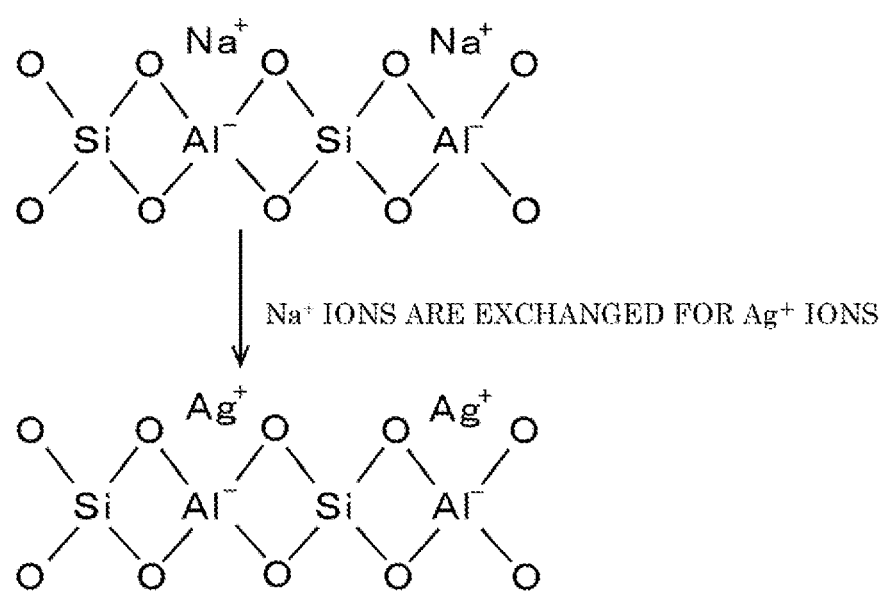
Figure 2:
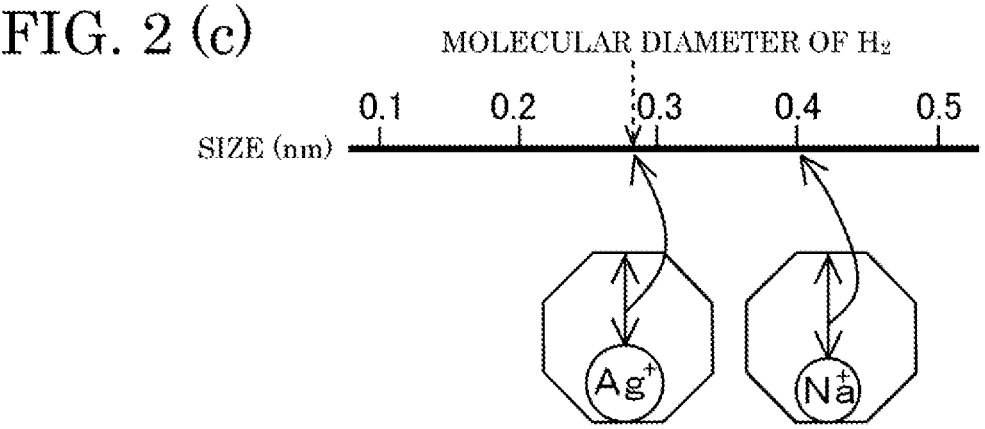

Here, the zeolite AgX will be described. FIG. 2 is an explanatory diagram regarding the zeolite AgX. FIG. 2(a) is a schematic diagram of the crystal structure of the zeolite, and FIG. 2(b) is an explanatory diagram of a reaction in which sodium sites of zeolite 13X are substituted with silver. FIG. 2(c) is an explanatory view showing that as a result of substituting the sodium sites of the zeolite 13X with silver, the size of its micropore diameter is reduced.

As shown in FIG. 2(a), zeolite is a kind of silicate, and the basic units of the structure of the zeolite are tetrahedral structure of $(SiO_4)^{4-}$ and $(AlO_4)^{5-}$. These basic units are successively linked together three-dimensionally to form a crystalline structure. Various crystalline structures of the zeolite are formed depending on the type of linkage of the basic units. Each formed crystalline structure has an intrinsic uniform micropore diameter. Because of its uniform micropore diameter, the zeolite has properties, such as molecular sieve, adsorption, and ion exchange capability.

For example, zeolite 13X is zeolite X widely used industrially, and its composition is $Na_{86}[(AlO_2)_{86}(SiO_2)_{106}]\cdot 276H_2O$. As shown in FIG. 2(b), zeolite AgX usable in the heat source device 100 of the present invention can be obtained by ion-exchanging the sodium sites, which are ion exchange sites of the zeolite 13×, with silver. A silver ion exchange rate in the zeolite AgX is 90% or more, and preferably 95% or more.

The zeolite AgX is not preferably ion-exchanged with any material other than silver. That is, in the zeolite AgX, substantially all sodium sites of the zeolite 13X are preferably ion-exchanged with silver. With such a high ion exchange rate, the zeolite has a very excellent hydrogen molecule adsorption capability. This is because, as shown in FIG. 2(*c*), the micropore diameter (of approximately 0.4 nm) of the zeolite 13X having sodium sites before being ion-charged with silver is too large to trap hydrogen molecules (molecule diameter: approximately 0.29 nm). However, when sodium sites of the zeolite 13X are ion-exchanged with silver, the micropore diameter of this zeolite becomes an optimal micropore diameter (of approximately 0.29 nm) for trapping a hydrogen molecule, whereby consequently the zeolite 13X ion-charged with silver can effectively adsorb hydrogen molecules with high efficiency.

In actual use, the zeolite AgX is preferably processed into granules. The particle size of the zeolite AgX in that case is preferably between 8×12 mesh and 10×20 mesh (JIS K 1474-4-6). Regarding the mesh notation of the particle size, for example, the notation "10×20 mesh" means that a particle passes through the 10 mesh sieve, but does not pass through the 20 mesh sieve, that is, the particle size ranges from 10 to 20 mesh. The term "10 mesh" indicates that there are 10 gratings per inch (which is approximately 2.54 cm), that is, the size of one grating is approximately 2.54 mm.

The above-mentioned silver zeolite 1 is accommodated in the accommodation container 10. As shown in FIG. 1(*a*), for example, the accommodation container 10 is configured by a metal pipe 10 which is a cylindrical member. Metal meshes 11, each having a mesh size finer than the particle diameter of the silver zeolite 1, are provided on both ends of the metal pipe 10, so that the air permeability can be ensured in the metal pipe 10 (first embodiment). As shown in FIG. 1(*b*), the metal pipe 10 may have a double pipe structure that includes an inner pipe 10*a* and an outer pipe 10*b* (second embodiment). In this case, the inner pipe 10*a* and the outer pipe 10*b* are connected and fixed by ribs or pillars (not shown), thereby causing a heat medium to flow through an annular space formed between the inner pipe 10*a* and the outer pipe 10*b*. By doing so, the thermal efficiency of the heat source device 100 is further improved, and the usability thereof is also made better. As the heat medium, water, oil, tin in a molten state, or the like can be used.

When adopting the configuration of the second embodiment shown in FIG. 1(*b*) as the heat source device 100, the size of the annular space formed between the inner pipe 10*a* and the outer pipe 10*b* (separation distance between the inner pipe 10*a* and the outer pipe 10*b*) is preferably set appropriately according to the size (particle diameter) of the silver zeolite 1. For example, the separation distance between the inner pipe 10*a* and the outer pipe 10*b* is set to 0.5 to 10 times and preferably 1 to 5 times as large as the particle diameter of the silver zeolite 1. In this case, the catalytic reaction heat generated at the surface of the silver zeolite 1 (to be described in detail later) is transferred from the inner pipe 10*a* to the outer pipe 10*b* with less loss while suppressing an excessive increase in the flow resistance of the heat medium through the annular space serving to exchange heat. As a result, this can achieve the heat source device 100 that makes the most of the properties of the silver zeolite 1, which is used in the heat source device 100.

Examples of the material usable for the metal pipe 10 and the metal mesh 11 include various metals, such as iron, copper, silver, nickel, aluminum, titanium, and stainless steel, and an alloy containing any of these metals. Since the metal pipe 10 and the metal mesh 11 come into contact with a wet combined gas G (to be described in detail later), aluminum, titanium, and stainless steel, which have adequate corrosion resistance, are preferably used. By using the metal pipe 10 that has a ventilation structure (mesh 11) made of metal with the corrosion resistance, the catalytic reaction between the hydrogen and oxygen in the air through the silver zeolite can more efficiently proceed within the metal pipe 10 without any leakage of the silver zeolite from the metal pipe 10, thus enabling the catalytic reaction heat to be suitably used as the heat source.

The mesh 11 provided especially on the end of the metal pipe 10 on the downstream side in the ventilation direction preferably has a finer mesh size (which is finer than 20 mesh, for example) than the particle diameter of the silver zeolite. The silver zeolite 1 adjusted between 8×12 mesh and 10×20 mesh has better usability. Thus, the provision of the mesh 11 with the finer mesh size than 20 mesh on the downstream side in the ventilation direction can achieve both the holding of the silver zeolite 1 in the metal pipe 10 and the air permeability of the metal pipe 10. Note that the size of the mesh 11 on the upstream side in the ventilation direction is not particularly limited, but if a mesh with a mesh size finer than 20 mesh is also adopted on the upstream side in the ventilation direction as in the downstream side in the ventilation direction, the silver zeolite 1 remains within the metal pipe 10 even when the mixed gas G flows backward, thus making it possible to maintain the safe situation.

The above-mentioned accommodation container 10 is ventilated with the mixed gas G containing hydrogen, steam, and air. The mixed gas G is a wet gas because it contains steam. However, when the mixed gas G comes into contact with the silver zeolite 1 inside the accommodation container 10, hydrogen contained in the mixed gas G is adsorbed into the silver zeolite 1, and then the adsorbed hydrogen reacts with the oxygen in the air contained in the mixed gas G through the silver zeolite 1, thereby generating a large amount of catalytic reaction heat during that time. At this time, the accommodation container (metal pipe) 10 with the metal meshes 11 provided on both ends thereof has good air permeability and excellent thermal efficiency, and thus increases its temperature relatively quickly when receiving the catalytic reaction heat between the hydrogen and the oxygen through the silver zeolite 1. In particular, when adopting zeolite AgX as the silver zeolite 1, the temperature of the zeolite AgX accommodated in the accommodation container 10 becomes 400° C. or higher after one minute has elapsed from the ventilation of the accommodation container 10 at normal temperature (of 15 to 25° C.) with the mixed gas G. As a result, the temperature of the accommodation container 10 also increases significantly from the normal temperature to approximately 400° C. Meanwhile, since the catalytic reaction between the hydrogen and the oxygen in the air through the silver zeolite proceeds in the presence of steam, no hydrogen explosion occurs even when the catalytic reaction heat is continuously generated to cause the high-temperature situation, which can ensure the high level of safety.

The composition of the mixed gas G preferably has a hydrogen concentration of 1 to 20% by volume, a steam concentration of 1 to 95% by volume, and an air concentration of 1 to 95% by volume. The composition of the mixed gas G more preferably has a hydrogen concentration of 1 to 15% by volume, a steam concentration of 10 to 90% by volume, and an air concentration of 5 to 80% by volume. The mixed gas G preferably has a temperature of 100° C. or higher, more preferably 120° C. or higher, and most preferably 130° C. or higher.

By causing such a mixed gas G to be in contact with the silver zeolite 1, the catalytic reaction between the hydrogen and the oxygen in the air through the silver zeolite 1 continuously proceeds efficiently while maintaining the high level of safety. Consequently, the temperature of the accommodation container 10 is increased, enabling the recovery of heat therefrom. The recovered heat can be utilized as the heat source for various devices.

In this way, according to the present invention, the heat source device based on an entirely new concept not proposed hitherto can be achieved with the relatively simple configuration in which the silver zeolite 1 (preferably the zeolite AgX) is charged into the accommodation container (metal pipe) 10 provided with the metal meshes 11 on both ends thereof, causing the accommodation container 10 to be ventilated with the mixed gas G containing hydrogen, steam, and air.

INDUSTRIAL APPLICABILITY

The heat source device of the present invention can be utilized as various heat sources for industries. For example, the heat source device of the present invention can be utilized as a heat source system in combination with a fuel cell or a power generating material. In addition, the heat source device of the present invention can also be utilized as heat sources for ordinary households, such as air heating and cooking appliances. The method for using silver zeolite of the present invention can also be utilized in each of the fields exemplified above.

REFERENCE SIGNS LIST

1 Silver Zeolite
10 Accommodation Container (Metal Pipe)
10A Inner Pipe
10B Outer Pipe
11 Ventilation Structure (Mesh)
100 Heat Source Device
G Mixed Gas

The invention claimed is:

1. A heat source device utilizing a catalytic reaction heat of silver zeolite, the heat source device comprising
an accommodation container for accommodating the silver zeolite while ensuring air permeability, wherein
the accommodation container is configured to be ventilated with a mixed gas containing hydrogen, steam, and air,
a temperature of the silver zeolite accommodated in the accommodation container at 15° C. to 25° C. becomes 400° C. or higher after one minute has elapsed from the ventilation of the accommodation container with the mixed gas having a temperature of 100° C.,
the temperature increases due to catalytic reaction between the hydrogen and oxygen from the air in the mixed gas,
the steam is provided to and does prevent explosive reaction between the hydrogen and the oxygen, and
the catalytic reaction heat can be utilized as a heat source.

2. The heat source device of claim 1, wherein
the mixed gas has a hydrogen concentration of 1 to 20% by volume, a steam concentration of 1 to 95% by volume, an air concentration of 1 to 95% by volume, and a temperature of 100° C. or higher.

3. The heat source device of claim 1, wherein
the silver zeolite is at least one selected from the group consisting of zeolite AgX in which at least a part of ion exchange sites included in zeolite X is substituted with silver, zeolite AgA in which at least a part of ion exchange sites included in zeolite A is substituted with silver, zeolite AgY in which at least a part of ion exchange sites included in zeolite Y is substituted with silver, zeolite AgL in which at least a part of ion exchange sites included in zeolite L is substituted with silver, and zeolite Ag mordenite in which at least a part of ion exchange sites included in zeolite mordenite is substituted with silver.

4. The heat source device of claim 1, wherein
the silver zeolite is at least one selected from the group consisting of zeolite AgMX in which at least a part of ion exchange sites included in zeolite X is substituted with silver and a metal other than silver, zeolite AgMA in which at least a part of ion exchange sites included in zeolite A is substituted with silver and a metal other than silver, zeolite AgMY in which at least a part of ion exchange sites included in zeolite Y is substituted with silver and a metal other than silver, zeolite AgML in which at least a part of ion exchange sites included in zeolite L is substituted with silver and a metal other than silver, and zeolite AgM mordenite in which at least a part of ion exchange sites included in zeolite mordenite is substituted with silver and a metal other than silver.

5. The heat source device of claim 4, wherein
the metal other than silver is at least one metal selected from the group consisting of lead, nickel, and copper.

6. A method for using silver zeolite, wherein
a catalytic reaction heat generated by ventilating silver zeolite with a mixed gas containing hydrogen, steam, and air is utilized as a heat source, wherein
the silver zeolite is ventilated with the mixed gas such that a temperature of the silver zeolite at 15° C. to 25° C. becomes 400° C. or higher after one minute has elapsed from the ventilation of the silver zeolite with the mixed gas having a temperature of 100° C., wherein
the temperature increases due to catalytic reaction between the hydrogen and oxygen from the air in the mixed gas,
the steam is provided to and does prevent explosive reaction between the hydrogen and the oxygen, and
the catalytic reaction heat can be utilized as a heat source.

7. The method of claim 6, wherein
the mixed gas has a hydrogen concentration of 1 to 20% by volume, a steam concentration of 1 to 95% by volume, an air concentration of 1 to 95% by volume, and a temperature of 100° C. or higher.

8. The method of claim 6, wherein
the silver zeolite is at least one selected from the group consisting of zeolite AgX in which at least a part of ion exchange sites included in zeolite X is substituted with silver, zeolite AgA in which at least a part of ion exchange sites included in zeolite A is substituted with silver, zeolite AgY in which at least a part of ion exchange sites included in zeolite Y is substituted with silver, zeolite AgL in which at least a part of ion exchange sites included in zeolite L is substituted with silver, and zeolite Ag mordenite in which at least a part of ion exchange sites included in zeolite mordenite is substituted with silver.

9. The method of claim 6, wherein
the silver zeolite is at least one selected from the group consisting of zeolite AgMX in which at least a part of ion exchange sites included in zeolite X is substituted with silver and a metal other than silver, zeolite AgMA in which at least a part of ion exchange sites included in the zeolite A is substituted with silver and a metal other than silver, zeolite AgMY in which at least a part of ion exchange sites included in zeolite Y is substituted with silver and a metal other than silver, zeolite AgML in which at least a part of ion exchange sites included in zeolite L is substituted with silver and a metal other than silver, and zeolite AgM mordenite in which at least a part of ion exchange sites included in zeolite mordenite is substituted with silver and a metal other than silver.

10. The method of claim 9, wherein
the metal other than silver is at least one metal selected from the group consisting of lead, nickel, and copper.

* * * * *